Oct. 18, 1966

D. J. KERSTEN 3,279,550

TRUCK LOAD MEASURING SYSTEM

Filed Dec. 23, 1963

INVENTOR.
DONALD J. KERSTEN

BY *McLaughlin & Cahill*

ATTORNEYS

Oct. 18, 1966 D. J. KERSTEN 3,279,550
TRUCK LOAD MEASURING SYSTEM
Filed Dec. 23, 1963 3 Sheets-Sheet 3

INVENTOR.
DONALD J. KERSTEN
BY McLaughlin & Cahill
ATTORNEYS

United States Patent Office 3,279,550
Patented Oct. 18, 1966

3,279,550
TRUCK LOAD MEASURING SYSTEM
Donald J. Kersten, 5623 N. 68th Place, Scottsdale, Ariz.
Filed Dec. 23, 1963, Ser. No. 332,726
5 Claims. (Cl. 177—136)

The present invention pertains to truck load measuring systems and more specifically, to a load measuring system that is mounted on a truck and may be utilized to measure the load on the truck when truck weighing scales are not convenient.

Truck load measuring systems of the prior art have utilized several schemes to sample the loading of the load bearing portion of the truck. These schemes have included the utilization of variable resistance devices, hydraulic devices, pneumatic devices, strain gauges, and relatively modern load cells. In each of these systems difficulty has been presented by the various thrusts imparted to the load measuring devices through the load carried by the truck. The lack of directional sensitivity of the prior art load measuring systems renders the systems grossly inaccurate since the mounting of the sensing device has generally been upon a structural element that is subjected to loadings other than a specific flexural direction thus imposing on the sensing devices thrusts and side loadings rendering the ultimate measurement of load susceptible to substantial deviation. Through subtractive or additive measurements of directional forces not directed in a specific loading direction, the measurement of a truck load may become shrouded by side loadings of the measuring device. In addition to the directional insensitivity, some prior art devices have utilized complicated and expensive lever arm systems to reduce the loading presented to the load cell and, in so doing, further encumber the directional sensitivity and thus reduce the accuracy that can inherently be provided by the utilization of a load cell.

Accordingly, it is an object of the present invention to provide a truck load measuring system that may be truck mounted and will provide an accurate measurement of truck loads.

It is another object of the present invention to provide a truck load measuring system that is sensitive to forces in a predetermined direction measurable by a load cell and relatively insensitive to thrusts or side loadings resulting in forces not in said predetermined direction.

It is another object of the present invention to provide a truck load measuring system that may be readily installed by unskilled workmen and which may be calibrated prior to being installed.

It is still another object of the present invention to provide a light weight and simple truck load measuring system that is inexpensive and reliable.

It is a further object of the present invention to provide a truck load measuring system that may be utilized on a vehicle without greatly increasing the height of the truck bed and which does not require force-reducing lever arms to measure the truck load.

Further objects and advantages of the present invention will become apparent to those skilled in the art as the description thereof proceeds.

Briefly, in accordance with one embodiment of the present invention, a load cell is mounted within a truck load measuring system having two basic portions. The first portion being attachable to the frame of the truck bed, referred to herein as the load bearing frame, and the second portion being attachable to the truck frame. Thus, the system of the present invention includes a device that is interposed between the truck frame and the load bearing frame. For example, the load supporting framework of the concrete mixer on a ready mix truck may be separated from the truck frame through the utilization of the truck load measuring system of the present invention. The two portions of the present load measuring system are mounted as described above and are supported in spaced-apart fixed relationship relative to each other to permit the upper portion to flex relative to bottom portion. The load cell is supported integral with the bottom portion and with the load sensitive axis thereof perpendicular to the direction of flexure of the upper portion. The load bearing surface of the load cell is placed in abutting relationship with the upper portion while the system is unloaded.

The present invention may more readily be described by reference to the accompanying drawings in which.

Figure 1:
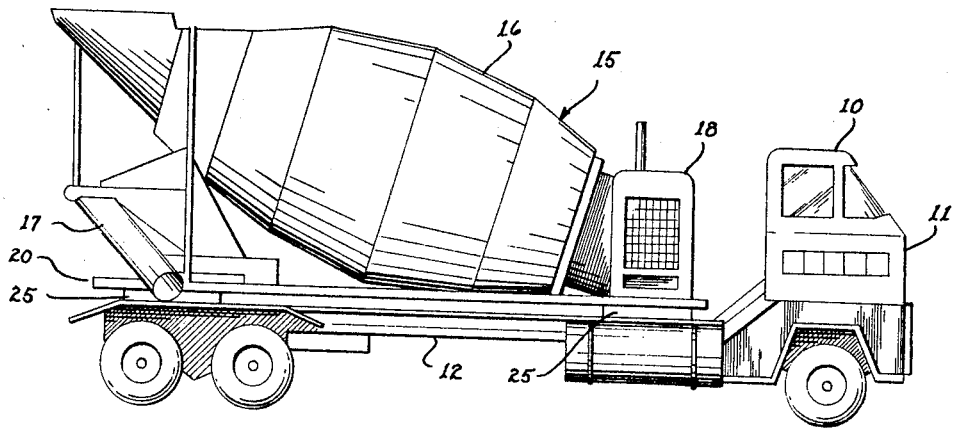
FIG. 1 is a schematic illustration of a concrete truck showing one location that may be used for mounting the load sensing apparatus of the present invention.

Referring now to FIG. 1, a schematic illustration of a concrete truck is shown having the customary truck body including a cab 10 and engine compartment 11 and having a basic truck frame 12 which is sold by manufacturers to truck body concerns that place an appropriate body on the truck frame to provide a specific truck design. In the truck design chosen for illustration in FIG. 1, a concrete mixer 15 having a mixing drum 16, pouring trough 17, and drum rotating mechanism 18 is manufactured and assembled on a load bearing frame 20. The load bearing frame 20 is then affixed to the truck frame 12 and sold as a package to the purchaser. In accordance with the present invention the load sensing devices 25 are placed between the load bearing frame and the truck frame at strategic locations and may be placed, as shown in FIG. 1, at each corner of the load bearing frame. The measurement of the amount of concrete mix in the concrete drum may be measured by the force exerted on the load measuring device; however, as stated previously in connection with the discussion of prior art, side loading and thrusts are also imparted from the load bearing frame to the truck frame and have heretofore added and subtracted to the load measuring reading so as to render the measurement of load inaccurate. The present invention overcomes these difficulties by providing a mechanism that absorbs side loadings and thrusts while permitting loading in a specific sensing direction to be transmitted to a load cell.

Figure 2:
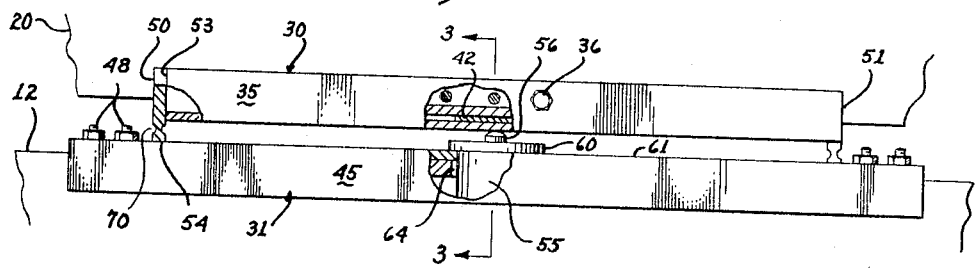
FIG. 2 is a side elevation, partially in section, of one embodiment of the present invention.
Figure 3:
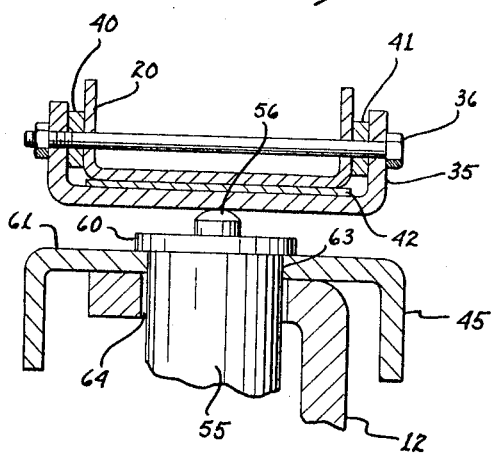
FIG. 3 is a cross sectional view of FIG. 2 taken along lines 3—3.

Referring to FIGS. 2 and 3, a load sensing device is shown constructed in accordance with the teachings of the present invention. The load sensing device 25 is divided into two portions 30 and 31, each of which is attachable to either the load bearing frame 20 or the truck frame 12. The upper portion 30 comprises an elongated channel member 35 constructed from a material such as steel. The channel member 35 is secured to the load bearing frame 20 through the expediency of bolts 36 extending horizontally through the channel 35 and through the frame 20. The channel is centered with respect to the frame through the insertion of a pair of spacers 40 and 41 positioned between the walls of the frame 20 and the channel 35. A loading spacer 42, extending a relatively short length along the channel member 35, is placed between the channel member and the load frame 20 at the center of the channel. The load spacer thus separates the horizontal surfaces of the channel and the load bearing frame thereby preventing interference between the two while permitting the channel member to flex in a manner to be described later.

The lower portion of the load measuring device comprises an inverted channel member 45, which may be identical to the upper channel and which is secured to the top of the truck frame 12, in the embodiment chosen for illustration, through the expediency of bolts 48 at either end thereof. The upper and lower channels 35 and 45 are spaced apart by three support means. The first and second support means comprise steel plates 50 and 51 which are butt-welded to the end 53 of the upper channel and butt-welded along one edge 54 of the plate to the top of the lower channel. The third means maintaining the separation between the upper and lower channels is a load sensing device such as a load cell 55. The load cell forms no part of the present invention and may be any of several designs available commercially. These cells generally operate on the principle that force applied to a force receiving member 56 causes the force receiving member to deflect inwardly of the load cell, and the deflection is detected and transduced to an electrical quantity. The method of transducing the deflection to an electrical signal may be implemented through the utilization of well known devices such as variable reluctance or variable strain resistance devices. The load cell utilized in the present invention includes an annular flange 60 that abuts the top 61 of the lower channel after the load cell has been inserted into a hole 63 provided therefor in the upper channel. A hole 64 is also drilled in the truck frame 12 and is of sufficient diameter to permit the load cell to extend therethrough without contact to the truck frame. In the particular load measuring system chosen for illustration, no compensation is provided for temperature change and its effect on the load cell. Under some circumstances, using load cells sensitive to temperature changes, it may be necessary to include a temperature compensation device such as, for example, a thermistor.

The end plates 50 and 51 are welded to both the upper and lower channel and may have portions of reduced cross sectional areas such as that illustrated in FIG. 2 at 70. The purpose of the reduced area will become apparent as the description of the operation proceeds. When the device as shown in FIGS. 2 and 3 is installed between the load bearing frame and the truck frame, any load exerted on the load bearing frame will be transmitted through the load measuring system to the truck frame. The load measuring system of the present invention is directionally sensitive in that side thrusts and side loadings exerted by the load bearing frame will be transmitted to the truck frame through the end plates 50 and 51 of the upper channel. The only force imparted to the load cell will be the force directed along the axis thereof transmitted to the cell through the flexure of the upper channel which is aided in its flexure by the reduction in cross sectional area 70 of the end plates. While the structure shown in FIG. 2 may appear to be a very nonyielding and rigid one, heavy loads exerted by truck loadings cause flexure of the upper channel which, as indicated above, is aided by the reduction in cross sectional area of the end plates, which flexure is readily measurable by commercial load cells. One distinct advantage that is provided by the system of the present invention is the fact that the upper and lower channels, with the end plates and load cell separating them, may be preassembled and calibrated prior to the installation of the apparatus on a truck. Thus, unlike prior art load measuring systems, the device of the present invention may be manufactured and calibrated under closely controlled laboratory conditions while the device may be installed by an ordinary workman without the need for expensive calibrating equipment or without the need of great skill or caution during installation. While the dimensions of the apparatus shown in FIGS. 2 and 3 are not critical, it has been found that an upper channel of 18 inches length and a lower channel of 24 inches length, separated by end plates of quarter-inch steel plate, have provided satisfactory results when used with a variable reluctance load cell having a diameter of approximately two inches and when used with a load spacer approximately three inches in length. The channels used had an outside vertical dimension of one and one-half inches each, an outside width of approximately four inches and constructed of quarter-inch steel. Accuracies in the order of a fraction of one percent are possible by the device of the present invention; further, the load measuring system is exceedingly rugged and requires no maintenance.

Figure 4:
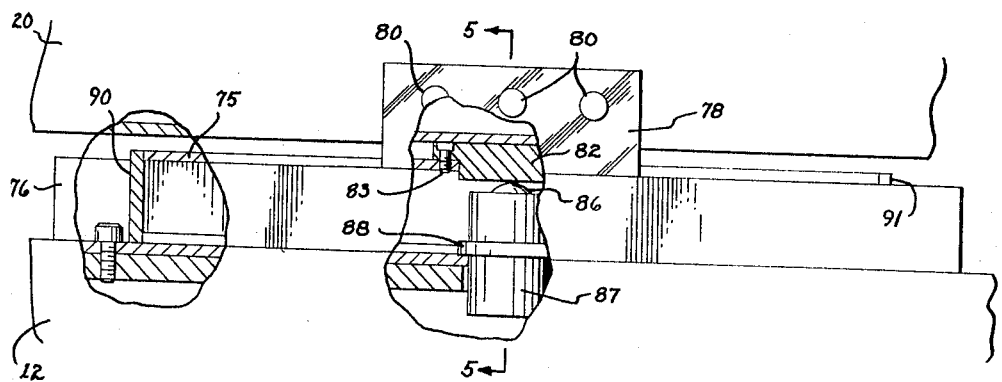
FIG. 4 is a side elevational view, partially in section, of another embodiment of the present invention.
Figures 5, 6:
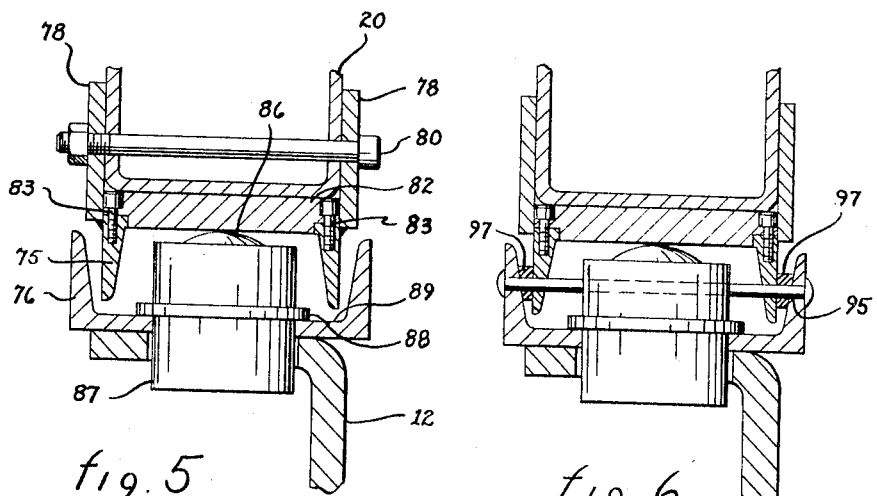
FIG. 5 is a cross sectional view of FIG. 4 taken along lines 5—5.
FIG. 6 is a cross sectional view showing a modification of the apparatus shown in FIG. 5.

Referring to FIGS. 4 and 5, a modification of the device shown in FIGS. 2 and 3 is shown. In FIGS. 4 and 5, standard commercially available channel iron has been used for the upper and lower channel 75 and 76 respectively with the upper channel being of a nominal three inch width and the lower channel of nominal four inch width. The upper channel 75 is inverted so that the sides thereof extend into the lower channel 76. A pair of side plates 78 are welded to the upper channel parallel to the sides thereof, and extend upwardly to provide a means for attachment of the upper channel to the load bearing frame 20. The side plates 78 are secured to the load bearing frame through the expediency of bolts 80 in a manner similar to the channel of FIG. 2. The load bearing spacer 82 in the case of FIGS. 4 and 5 is secured to the upper channel by machine screws 83 that are either flush or below the top of the spacer. The spacer is shaped to extend through a hole provided in the top of the upper channel and to extend therethrough into abutting relation with the load receiving member 86 of the load cell 87. The load cell is mounted by fitting it into the lower channel and is positioned through the utilization of an annular ring 88 that abuts the bottom of the bottom channel 89 as shown in FIG. 5. The upper and lower channels are secured together through the utilization of end plates 90 and 91 which are butt-welded to the ends of the upper channel and which are welded along the edges thereof to the inside surfaces of the lower channel. The freedom from side thrusts and side loadings of the modification shown in FIGS. 4 and 5 is excellent; however, the rigidity afforded by the side plates when welded to the inside surface of the lower channel renders the upper channel somewhat less flexible than the embodiment shown in FIGS. 2 and 3. Therefore, the embodiment shown in FIGS. 4 and 5 may be utilized in those instances where the loads being encountered are of substantially greater magnitude than in those instances utilizing the embodiment of FIGS. 2 and 3.

Referring to FIG. 6, a modification of the cross section of FIG. 5 is shown. In FIG. 6 it is seen that a pivot pin 95 extends horizontally through the flanges of both the upper and lower channels. The pivot pin may be formed of steel rod and may be mounted for relative rotation with the channels or may be press-fit into both the inner and outer channels or any combination of these two methods. The upper and lower channels may be laterally spaced through the utilization of spacers 97 mounted on the pin between the outer surface of the upper channel and the inner surface of the lower channel. The degree of flexure provided by the embodiment of FIG. 6 renders the system extremely sensitive to relatively light loadings and may be utilized in those instances where only light loads are anticipated. The pin of FIG. 6 includes the disadvantages of possible wear and somewhat less structural rigidity to side thrusts and loading; however, even the pinned embodiment of FIG. 6 is a substantial advance over the prior art and is capable of accuracy of greater than one percent (1%).

Figure 7:
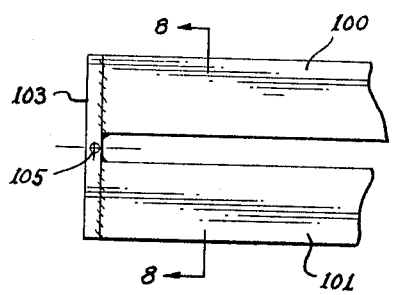
FIG. 7 is a partial side elevational view showing a further modification of the present invention.
Figure 8:
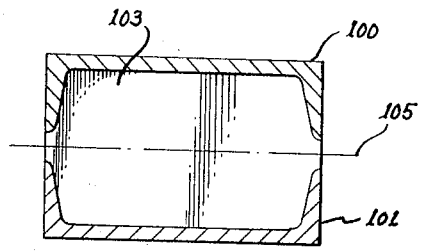
FIG. 8 is a cross sectional view of FIG. 7 taken along lines 8—8.

Referring to FIGS. 7 and 8, another embodiment of the present invention is shown. In FIG. 7 only the end portion of an upper and lower channel are shown. The upper channel 100 is of the same dimension as the lower channel 101 and is inverted with respect thereto. The two channels are separated and are affixed to each other through the utilization of an end plate 103 which is buttwelded to the ends of both the upper and lower channels. The upper and lower channels may be secured to the load bearing frame and the truck frame by any convenient means such as vertical extensions welded to the channels in a manner similar to the extensions shown in FIGS. 5 and 6. The rigidity of the structure of FIGS. 7 and 8 is excellent and the ability of the device to transmit side thrusts and side loadings from the load bearing frame to the truck frame without affecting the load cell is excellent. The end plate flexes about an axis shown at 105 and may include a reduced cross sectional area along that axis to aid the flexibility of the upper channel.

Figure 9:
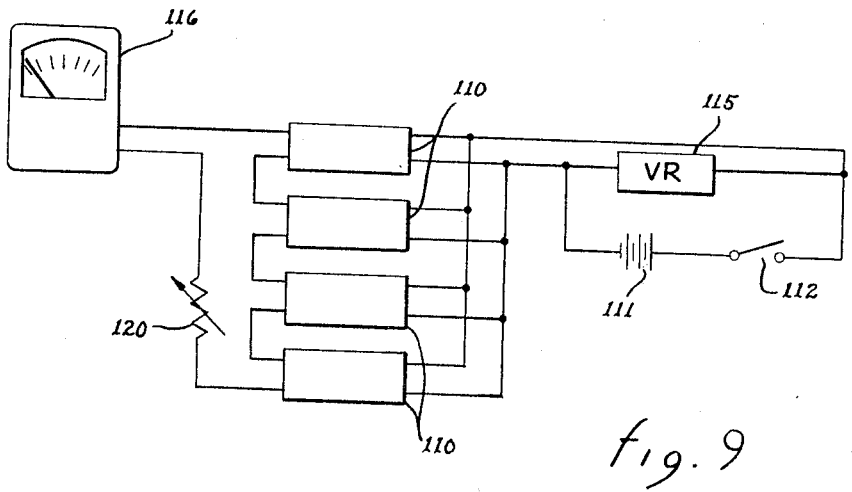
FIG. 9 is a schematic circuit diagram of an electrical circuit appropriate for use in the load measuring system of the present invention.

Referring to FIG. 9, a schematic diagram is shown of a circuit that will normally be used in the load measuring system of the present invention. The load sensing devices 110 are each connected to a suitable source of regulated voltage. A battery 111 is shown connected to the load sensing devices through a switch 112. The battery may be a self-contained battery intended primarily for use in the load measuring system of the present invention; alternatively, the battery may be the truck's battery and the measuring system of the present invention may be connected to the electrical system of the truck. Certain types of load cells required alternating current for proper operation; in such cases, the battery 111 of FIG. 9 may be replaced by a suitable A.C. generator driven either by the truck (engine or electrical system) or by a self-contained power supply. Whether a separate battery or the truck electrical system is used, it is usually necessary to employ a voltage regulator such as that shown at 115 to insure the stability of the voltage applied to the load sensing devices 110.

In the schematic diagram of FIG. 9, only four load measuring devices 110 are shown; it will be obvious that any number of devices may be used, the number depending on the application in which the load measuring system of the present invention is to be used. The electrical output of each of the load sensing devices 110 is summed and measured through the use of a meter 116. In those applications requiring the utmost in accuracy, it may be advisable to substitute a bridge-null reading system for the meter 116 of FIG. 9. The sensitivity afforded by a null reading system may increase the accuracy, increase sensitivity, and eliminate meter error to thereby provide a load measuring system with at least one order of magnitude greater accuracy than prior art load measuring systems. In some instances it may be desirable to employ a linear amplifier for amplifying the signals derived from the load sensing devices prior to application of the signal to the meter 116. Since the truck will seldom be perfectly level when a load measurement is made, it is necessary to correct for the decreased component of force perpendicular to the load cell caused by the angle of tilt. Accordingly, a variable impedance 120 is shown in series with the load measuring devices 110 to impart a resistance change in the measurement circuit proportional to the cosine of the angle of tilt. The impedance adjustment may readily be made through the use of switches or a potentiometer manually adjusted by the operator. The use of a circular type level, mounted so that its inclination coincides with the inclination of the load, and having a scale to indicate to the operator the angle of tilt, may be used to provide a means for determining the switch for potentiometer setting. The greater the angle of tilt, the smaller the impedance 120 becomes; thus, the voltage indicated by the meter 116 will remain proportional to the total load even though the load sensing devices may provide an output less than proportional to the load because of the tilt of the truck or load bearing frame. The tilt compensation provided by the variable impedance 120 may be automatically implemented through the utilization of a tilt sensor such as that shown in FIG. 10.

Figure 10:
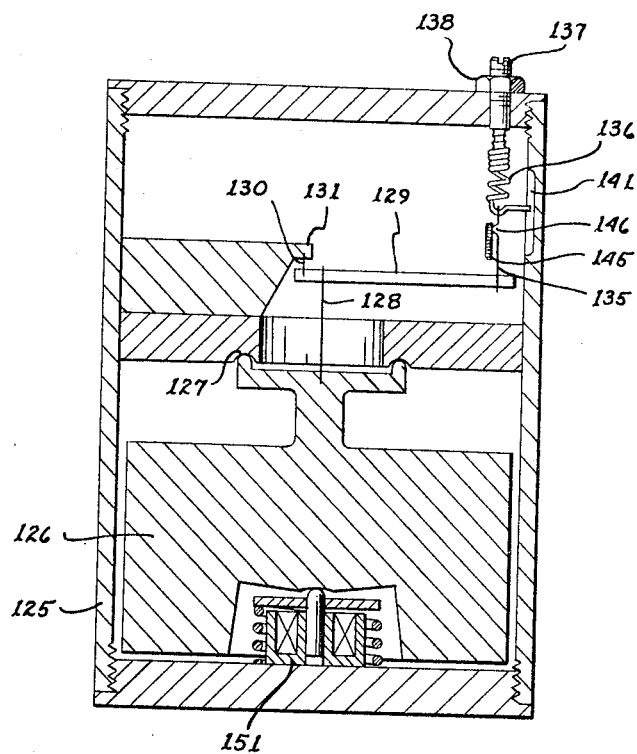
FIG. 10 is an illustration of a tilt sensor constructed in accordance with the teachings of the present invention to provide tilt correction in the load measuring system.

Referring to FIG. 10, a tilt sensing device is shown enclosed within a housing 125 that may be mounted on the load bearing frame or on any surface that will have the same tilt as the load bearing frame. A pendulous weight 126, having a circular fulcrum 127, is supported by a wire 128 from a lever 129. The lever 129 is supported through flexure 130 from an arm 131 secured to the housing 125. The opposite end of the lever 129 is connected through a flexure 135 to a coil spring 136. The spring is secured to the housing 125 by adjusting screw 137 and lock nut 138. The end of the spring includes a tongue 140 which rides in a slot 141 provided in the housing 125. A resistance element 145, which is a non-linear wire wound resistor shaped to provide a resistance proportional to the cosine of the tilt angle, is supported by any convenient means adjacent to a contact 146 secured to the flexure 135. Rotation of the spring 136 is restrained by the spring tongue 140, and the initial spring rate is adjusted by threading the shaft 137 into the spring. The initial tension on the spring is adjusted by raising or lowering the adjustment screw 137 by turning nut 138 while restraining screw 137 from rotation.

A spring loaded solenoid 151 is mounted on the bottom of the housing 125 and is spring-urged upwardly to contact the bottom of the pendulous weight 126. Energization of the solenoid 151 compresses the spring and permits the pendulous weight to hang from wire 128. The operation of the tilt sensor of FIG. 10 assumes that the tilt angle will be less than that angle required to cause the pendulous weight 126 to contact the housing 125. This maximum angle can obviously be increased by the proper selection of the dimensions of the tilt sensor and will usually not exceed ten degrees since grades encountered by trucks greater than ten degrees are exceedingly rare. When it is desired to make a load measurement using the tilt sensor of FIG. 10, the solenoid 151 is energized to thereby permit the pendulous weight 126 to hang from the wire 128. Any tilt angle will result in a force multiplication caused by the pendulous weight exerting a force against the circular fulcrum 127 and transmitting this force through the wire and lever arrangement to displace the contact 146. The resulting impedance change caused by the change in contact location on the resistance element 145 will reflect the appropriate voltage variation in the metered circuit to compensate for the tilt angle experienced by the load.

The load bearing system of the present invention thereby provides a means for measuring the load on a truck accurately, efficiently, and inexpensively by transmitting all forces not in a specified direction from a load bearing frame to the truck frame without affecting the reading exhibited by a load cell. The magnitude of the loadings may dictate that a specific one of the embodiments illustrated be utilized; however, great design flexibility is inherent in the present invention and many modifications may be made therein without departing from the spirit and scope of the invention. The present invention provides a means whereby the load sensing system may be prefabricated inexpensively and pre-calibrated so that no expense is entailed at the installation of the devices through having to train personnel in the care, handling, and calibration of the devices. It will be obvious to those skilled in the art that many modifications may be made in several of the structural aspects of the specific embodiments chosen for illustration; however, it is intended that the scope of the present invention be limited only by the claims appended hereto.

1. A truck load measuring system comprising:
   (A) an upper channel secured to a load bearing frame;
   (B) a load spacer positioned between, and in abutting relation with, said upper channel and said load bearing frame;
   (C) a lower channel secured to a truck frame;
   (D) a pair of end plates each secured to an end of said upper channel and secured to the top of said lower channel to maintain said channels in vertical spaced-apart relation and to permit said upper channel to flex at the approximate center thereof relative to said lower channel;
   (E) a load cell mounted in fixed position on said lower channel and extending between said channels in abutting relation with said upper channel at the approximate center thereof.

2. A truck load measuring system comprising:
   (A) an upper channel secured to a load bearing frame;
   (B) a load spacer positioned between, and in abutting relation with, said upper channel and said load bearing frame;
   (C) a lower channel secured to a truck frame;
   (D) a pair of end plates each secured to an end of said upper channel and secured along the edges of said plates to the inside surface of said lower channel to maintain said channels in vertical spaced-apart relation and to permit said upper channel to flex at the approximate center thereof relative to said lower channel;
   (E) a load cell mounted in fixed position on said lower channel and extending between said channels in abutting relation with said upper channel at the approximate center thereof.

3. A truck load measuring system comprising:
   (A) an upper portion secured to a load bearing frame;
   (B) a lower portion secured to a truck frame;
   (C) means secured to said upper and lower portions to maintain said portions in spaced-apart relation and to permit relative flexure therebetween;
   (D) a load cell mounted on one of said portions in abutting relation with the other of said portions and positioned between said upper and lower portions at a point of flexure therebetween;
   (E) said load cell including electrical input and output terminals;
   (F) a voltage source;
   (G) means connecting said source to said load cell input terminals;
   (H) a tilt sensor for translating the angle of inclination thereof into an impedance;
   (I) means connecting said impedance in series with said output terminals.

4. A truck load measuring system comprising:
   (A) an upper channel secured to a load bearing frame;
   (B) a load spacer positioned between and in abutting relation with said upper channel and said load bearing frame;
   (C) an upper channel secured to a load bearing frame;
   (D) a lower channel secured to a truck frame;
   (E) means secured to said upper and lower channels to maintain said channels in spaced-apart relation and to permit relative flexure therebetween;
   (F) a load cell mounted on one of said channels in abutting relation with the other of said channels and positioned between said upper and lower channels at a point of flexure therebetween;
   (G) said load cell including electrical input and output terminals;
   (H) a voltage source;
   (I) means connecting said source to said load cell input terminals;
   (J) a tilt sensor for translating the angle of inclination thereof into an impedance;
   (K) means connecting said impedance in series with said output terminals.

5. A truck load measuring system comprising:
   (A) an upper channel secured to a load bearing frame;
   (B) a load spacer positioned between, and in abutting relation with, said upper channel and said load bearing frame;
   (C) a lower channel secured to a truck frame;
   (D) a pair of end plates each secured to an end of said upper channel and secured to the top of said lower channel to maintain said channels in vertical spaced-apart relation and to permit said upper channel to flex at the approximate center thereof relative to said lower channel;
   (E) a load cell mounted in fixed position on said lower channel and extending between said channels in abutting relation with said upper channel at the approximate center thereof;
   (F) said load cell including electrical input and output terminals;
   (G) a voltage source;
   (H) means connecting said source to said load cell input terminals;
   (I) a tilt sensor for translating the angle of inclination thereof into an impedance;
   (J) means connecting said impedance in series with said output terminals.

References Cited by the Examiner

UNITED STATES PATENTS

| | | | |
|---|---|---|---|
| 2,704,661 | 3/1955 | Maugh | 177—137 |
| 2,942,864 | 6/1960 | Sikora | 73—504 X |
| 3,059,343 | 10/1962 | Kermode | 33—215 |
| 3,083,469 | 4/1963 | Herbst | 33—215 |
| 3,090,226 | 5/1963 | Corti et al. | 73—141 |
| 3,146,839 | 9/1964 | Carlson | 177—136 |
| 3,199,619 | 8/1965 | Hathaway | 177—136 |

FOREIGN PATENTS 793,246   4/1958   Great Britain.

RICHARD C. QUEISSER, *Primary Examiner.*

C. A. RUEHL, *Assistant Examiner.*